United States Patent Office 2,757,161
Patented July 31, 1956

2,757,161

METHOD OF AGGREGATING SOILS

Charles H. Rector, Jr., Webster Groves, Mo., assignor to Monsanto Chemical Company, St. Louis, Mo., a corporation of Delaware No Drawing. Application May 16, 1952,
Serial No. 288,306

12 Claims. (Cl. 260—41)

This invention relates to methods of improving the physical structure of soils. More specifically the invention relates to soil improvements for increasing crop yields and preventing natural erosion.

The ultimate utility and beneficial properties of top soils and soils of subsurface strata depend substantially upon the physical structure of that soil. Although most soils have a fine state of subdivision necessary to plant growth, many do not have other physical properties which enable the optimum growth and development of the plant, and the proper function of the various plant structures. In addition to the plant nutrients a soil must provide a continuous supply of both air and moisture. Soils of poor structure may become water-logged during wet seasons, which state excludes the necessary air. Soils of poor structure may lose moisture too rapidly by evaporation from the surface due to excessive capillary action and plants growing therein will be deprived of the required continuous and abundant supply of moisture. The latter effect becomes excessive in closely compacted soils, where also the growth of roots and stems are retarded due to the difficulty of penetrating the hard dense soil. Furthermore, soils of poor structure frequently experience poor germination of seeds planted therein, due to the lack of either air or moisture required for normal germination.

It is also well-known that soils of poor structure are subject to erosion, because when subjected to rainfall they quickly become saturated and the excess moisture flows across the surface of the soil or in a confined channel. This surface water washes away the fine soil particles and results in the displacement of large quantities of valuable soils. The quantity of surface water is increased both by the failure of the soil to absorb surface water and by the failure of the soil to provide a medium for transferring the water to underlying bodies of soil and to natural underground water courses.

The problem of increasing the tilth of soils and the problem of preventing erosion may both be solved, or the harmful effects greatly diminished, by providing a means of improving the physical structure of the soil. When soil is plowed and raked it is possible to provide a loose structure which retains moisture better and contains sufficient air for the propagation of plants. The improvement of soil structure by the tillage is not long lasting and the action of rain and sun will soon cause the soil to slake down and dry out, thereby losing its desirable properties.

If soil is cultivated over a number of years and especially if organic fertilizers are added thereto, the soil may gradually attain a good structure. This improvement in the structure is believed to be due to various humus decomposition products, including polysaccharides, generated by the soil bacteria which cause the decomposition. The improved soil structure enables larger quantities of air to be present and permits the maintenance of a more uniform supply of moisture in the soil, thereby providing a more suitable medium for the further culturing of soil bacteria. By this process the soil structure is improved by a cumulating process. Since clay and heavy loam soils may require many years to develop a satisfactory structure, it is desirable to provide a means of accelerating the formation of fertile soils. Furthermore these polysaccharides are themselves decomposed by soil bacteria and must be replaced by continuous applications of humus, or by crop rotation, or by turning under cover crops. Otherwise good soil structure may break down and revert to poor structure.

The primary purpose of this invention is to provide a means of quickly developing soil structure by synthetic additives. A further purpose of this invention is to provide a means of increasing the agricultural yield of soils, and particularly of soils of poor normal structure. A still further purpose is to provide a means of preventing erosion on exposed soil surfaces. A still further purpose of this invention is to provide synthetic substances which permit a more permanent improvement in the structure of the soil.

Soils of permanently good structure have the fine soil particles agglomerated into larger bodies or crumbs, which permit ready access of the air to their interstices and which at the same time retain moisture in an available form within the body of the crumbs. Soil of this structure will not lose moisture excessively by evaporation due to the insulation effect of the spaces or non-capillary pores containing air of high humidity which prevent excessive capillary action. Such soil does not shrink and form fissures and cracks on drying and retains a natural surface mulch which reduces evaporation. Thus, the optimum moisture and air content may be retained over long periods of time.

The use of this invention in the development of good soil structure by synthetic additives will be practicable in a wide variety of applications. It is useful in the rapid improvement of garden soils, especially in areas where infertile subsoil has been exposed. It is also useful in the improvement of average soils, and especially in areas where organic fertilizers are not available. It is also useful to enable the growth of root crops in areas where the closely compacted clay soil prevents the normal development of such crops. It is further useful in semi-arid regions where retention of soil moisture and minimization of solar evaporation are desirable. It is also useful in growing cover crops on road shoulders, filled areas, and graded embankments where erosion control is needed until the cover crops become well-established. Furthermore, the invention is useful in the prevention of erosion in areas where surface vegetation has been destroyed by natural phenomena or by misuse of soils. Further benefits of the present invention which result from the improvements in the normal soil structure are also contemplated.

In accordance with this invention it has been found that soils, and especially clay soils, can be improved with respect to aggregate stability by incorporating small proportions of polyvinyl esters of hydroxy-containing carboxylic acids. The hydroxy acids of which the polymers and copolymers are useful in the practice of this invention may be represented by the structure:

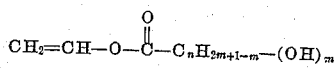

wherein $n$ is an integer from one (1) to five (5) and $m$ is an integer not greater than $n$.

Suitable polymers are the polymers and copolymers of vinyl lactate, vinyl gluconate, vinyl glycollate, vinyl leucinate, vinyl-α-hydroxy butyrate, vinyl hydroxy valerate, vinyl saccharinate and vinyl glucosaccharinate, for example polyvinyl lactate, the copolymer of vinyl acetate and vinyl glycollate, the copolymer of vinyl chloride and vinyl lactate, the copolymer of vinyl alcohol and vinyl glycollate, and the copolymers of the vinyl esters of hydroxy-containing carboxylic acids and other low molecular weight olefinic compounds which are not ionizable in soil water. In order to be useful in the practice of this invention the polymers must be water-soluble either in distilled water or in soil water and the copolymers must contain sufficient of the vinyl ester of the hydroxy carboxylic acid in order to render the copolymer water-soluble and preferably hydrophilic. By the term, "water-solubility" as used in this specification and claims it is meant to include true solutions and also intimate dispersions in soil water so as to enable the movement of the polymer molecules through the soils by the medium of moisture contained therein.

The polymers for use in the practice of this invention may be prepared by direct polymerization of the monomers such as vinyl lactate, vinyl glycoliate, vinyl-α-hydroxy butyrate and vinyl gluconate either alone or in admixture with suitable proportions of other olefinic monomers copolymerizable therein.

An alternative method of preparing the polymers for use in the practice of this invention involves the ester interchange of a vinyl ester polymer with the hydroxy carboxylic acid. This method may involve the reaction between polyvinyl acetate and glycolic, lactic or gluconic acids, or by the reaction of polyvinyl formate or other polymeric vinyl esters with the hydroxy carboxylic acids.

Further details of the preparation of suitable polymers are set forth with respect to the following specific examples:

EXAMPLE 1

A 500 ml., three-necked flask provided with a thermometer, rotary stirrer and reflux condenser was charged with 150 grams of 70 per cent glycolic acid solution in water and 25 grams of polyvinyl acetate (molecular weight 50,000). The flask and its contents were heated at reflux (105° C.) temperature for twenty hours. The reaction mass was then poured into acetone while stirring vigorously. The polymer which separated was dissolved in methanol and reprecipitated with acetone. The resulting purified polymer was dried in vacuum and found to be soluble in water. It was identified as polyvinyl glycollate.

EXAMPLE 2

The procedure of Example 1 was repeated except that a 75 per cent aqueous solution of lactic acid was used in place of glycolic acid. The resulting polymer was identified as polyvinyl lactate.

In the practice of this invention the polymeric vinyl esters of hydroxy acids may be added to the soil to the extent of from 0.001 to two per cent by weight of the tillable top soil, but optimum results are usually obtained by the use of 0.01 to two per cent by weight. The optimum results are usually affected by the molecular weights of the polymer. Molecular weights of 10,000, usually are required. Preferably the minimum molecular weight should be at least 15,000, but optimum results are often obtained if the molecular weight runs between 30,000, to 100,000. The invention is practicable with even higher molecular weight polymers but no further increase in efficiency is observed. Sometimes where the excessive molecular weight is due to the cross-linking of the polymer slight reductions in efficiency may be noticed. With very high molecular weight polyvinyl esters of hydroxy acids the viscosity of the aqueous solutions may be such that dispersion or dissolution in soil water is more difficult.

The polymers may be added directly to the soils if desired, but it is usually more feasible to add the polymers with a diluent or extender, which may be a solvent, for example water, or a solid carrier, such as peat moss, limestone, sand, clay, mineral fertilizer, silage or other fertilizing or soil improving substances. When added with a plant nutrient cooperative beneficial effects are noted in the rate of growth on crops on the treated soil. Soils improved by the fertilizer containing the polymers enable more rapid and abundant crop growth than can be obtained by the use of fertilizer alone. The utilization by the plants of any of the known fertilizer materials, containing basic nutrients, such as nitrogen, phosphorus, and potassium, as well as trace elements, such as boron, manganese, magnesium, molybdenum, cobalt and iron, may be improved by the addition of the structure-improving polymers described above.

Optimum improvement of soil structure is rapidly obtained if the polymer is thoroughly mixed with the soil by spading, cultivating, disking, harrowing, or other methods commonly used in agricultural art. However, desirable improvements may be obtained by simply adding the polymeric materials in aqueous solution or as a dry powder with or without diluents or carriers to the surface of the soil. In the latter case, the polymeric substance becomes slowly mixed with the soil by normal cycles of wetting and drying, freezing and thawing and the like.

The presence of water-stable aggregates manifests a combination of capillary and non-capillary pores in the soil, whereas a soil of poor structure has very few non-capillary pores. The looseness and porosity in a soil composed of stable aggregates permits the rapid infiltration of water and rapid percolation of excess water downward through the soil. The soil regains the condition of optimum aeration soon after rainfall ceases.

The moisture content of the soil after free drainage under the influence of gravity has removed excess water in non-capillary pores is termed "field capacity" and closely approximates the moisture equivalent which is readily determined in the laboratory. Treatment of the soil with polymers of vinyl esters of hydroxy acids raises the moisture equivalent significantly, and therefore the treated soil retains a higher percentage of the water which percolates through it after a rainfall.

The wilting point, that is, the moisture content of the soil at which plants are no longer able to extract sufficient water from the soil, determines the lower limit of water available for plant growth. The polyvinyl esters of hydroxy acids do not affect the wilting point of the soil significantly. Since the moisture equivalent is increased while the wilting point is unchanged, treatment of soil with the polymers results in a substantial increase in the amount of water retained by the soil and available for plant use.

The increased infiltration and percolation exhibited by soils composed of water-stable aggregates results in reduced runoff during a rainfall and therefore reduced erosion by running water. The aggregates, by virtue of their size and weight, are less readily carried by water and in addition are more stable to the destructive action of raindrops.

The rate of evaporation of water from the surface is affected by soil structure and also by the presence of organic colloids in the soil. A soil of good structure, such as is obtained by proper treatment of a soil with one of the polyvinyl esters of hydroxy acids and composed of water-stable aggregates, has in addition to capillary pores a large number of non-capillary pores. The action of these non-capillary pores is to interrupt the continuity of the capillary pores to slow down movement of moisture by capillary action. The transference of capillary water to the surface of the soil is slowed down and therefore the loss of moisture by evaporation from the surface is reduced.

The "working properties" or consistency of a soil are influenced by the state of aggregation of the soil. Soil of poor structure, when treated with a hydrophilic polymer, loses its stickiness and becomes loose and crumbly, becomes plastic at a higher water content and compared to the untreated soil behaves generally as if it were at a lower moisture content.

The polyvinyl esters of hydroxy acids described above are useful in preventing erosion even where plant growth is not the principal consideration. Thus, the compounds may be used on barren soils, which are unusually susceptible to erosion. Furthermore, it may be used in conjunction with herbicides for treatment of road shoulders, fire lanes in forested areas or other earth surfaces, where growth of vegetation is undesired and erosion is a serious problem. The herbicide is blended with the polymer to the extent of ten to 90 per cent of each, depending upon the requirements of the situation, type of plant to be destroyed and the natural structure of the soil, and applied to the plant surfaces or the soil in the area to be treated. The polymers and herbicide mixtures have a unique synergistic effect in that the polymers serve as adhesive to keep the herbicide in contact with plant surfaces and after washing off assist in the improvement of soil structures.

Further details of the use of polyvinyl esters of hydroxy acids and methods of evaluation are set forth with respect to the following examples:

EXAMPLE 3

The effect of the polymers on the percentage of water-stable aggregates was determined by the following procedure. To 100 grams of Miami silt loam pulverized to pass a 0.25 mm. sieve was added 30 ml. of distilled water containing the appropriate amount of the polymer. The soil was well-mixed and pressed through a four mm. sieve. After drying for at least two days in a warm room at low humidity, air at 50° C. was blown on the soil for ten minutes to complete the drying. Forty gram samples were placed on the top sieve of a set of three sieves, 0.84 mm., 0.42 mm., and 0.25 mm., arranged in order of decreasing size. The sieves were raised and lowered in water through a distance of 1.5 inches at the rate of thirty cycles per minute for thirty minutes. At the end of that time the sieves were raised, allowed to drain, the soil dried at 80° C. and weighed. The results are reported in Table I as the per cent of water-stable aggregates larger than 0.25 mm. Miami silt loam without the addition of polymers gave almost no water-stable aggregates.

Table I

PERCENT OF WATER-STABLE AGGREGATES, 0.25 MM., IN MIAMI SILT LOAM AFTER TREATMENT WITH POLYMERS

| Polymer | Percent Polymer by Weight Percent Aggregates >0.25 mm. | | | |
|---|---|---|---|---|
| | 0.0 | 0.01 | 0.02 | 0.1 |
| None (Control) | 1.0 | | | |
| Polyvinyl glycollate | | | | 57.8 |
| Polyvinyl lactate | | 3.3 | | 86 |
| Sodium alginate | | | 33 | |
| Polyvinyl methyl ether | | 0.3 | | 41.3 |
| "Carbowax 6000"=polyethylene oxide | | 0.3 | | 0.3 |
| "Methocel 50"=methoxy cellulose | | 0.3 | | 0.3 |
| "Methocel 1500"=Methoxy cellulose | | 0.5 | | 15.5 |
| | | 0.5 | | 13.3 |

The above data are more significant in view of the fact that polyvinyl lactate and polyvinyl glycollate are resistant to soil bacteria, whereas sodium alginate and the "Methocels" are subject to bacterial attack, whereby their effectiveness is seriously impaired.

The invention is defined by the following claims.

What I claim is:

1. A method of stabilizing the structure of a surface soil, which comprises intimately mixing the soil with from 0.001 to 2.0 per cent by weight of a water-soluble non-polyelectrolytic polymer of a compound having the structure:

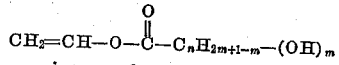

wherein $n$ is an integer from one (1) to five (5) and $m$ is an integer not greater than $n$, said polymer having a weight average molecular weight of at least 10,000.

2. The method defined by claim 1 wherein the polymer is polyvinyl glycollate.

3. The method defined by claim 1 wherein the polymer is polyvinyl lactate.

4. The method defined by claim 1 wherein the polymer is a copolymer of vinyl acetate and vinyl glycollate.

5. The method defined by claim 1 wherein the polymer is a copolymer of vinyl acetate and vinyl lactate.

6. The method defined by claim 1 wherein the polymer is a copolymer of vinyl chloride and vinyl lactate.

7. An aggregated surface soil containing dispersed therein from 0.001 to 2.0 per cent by weight of a water-soluble non-polyelectrolytic polymer of a compound having the structure:

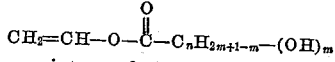

wherein $n$ is an integer from one (1) to five (5) and $m$ is an integer not greater than $n$, said polymer having a weight average molecular weight of at least 10,000.

8. The product of claim 7 wherein the polymer is polyvinyl glycollate.

9. The product of claim 7 wherein the polymer is polyvinyl lactate.

10. The product of claim 7 wherein the polymer is a copolymer of vinyl acetate and vinyl glycollate.

11. The product of claim 7 wherein the polymer is a copolymer of vinyl acetate and vinyl lactate.

12. The product of claim 7 wherein the polymer is a copolymer of vinyl chloride and vinyl lactate.

References Cited in the file of this patent

UNITED STATES PATENTS 2,145,345    Dreyfus _____ Jan. 31, 1939

OTHER REFERENCES

Geoghegan, M. J.: Fourth Int. Congress on Soil Science, vol. 1, July 24–August 1, 1950.